United States Patent [19]

Savaglia

[11] Patent Number: 5,771,625
[45] Date of Patent: Jun. 30, 1998

[54] FISH HOOK TRACE AND CONTAINER

[76] Inventor: Ian Savaglia, 483 Henley Beach Road, Fulham, South Australia 5024, Australia

[21] Appl. No.: 706,455

[22] Filed: Sep. 4, 1996

[30]   Foreign Application Priority Data

Sep. 12, 1995 [AU]  Australia .............................. PN 5371

[51] Int. Cl.⁶ ............................ A01K 91/00; F16G 11/00
[52] U.S. Cl. ...................... 43/42.74; 43/44.83; 43/44.84; 24/129 C
[58] Field of Search .............................. 43/42.74, 44.85, 43/44.83, 44.84, 43.1, 57.3; 24/129 C, 131 R, 716, 570

[56]         References Cited

U.S. PATENT DOCUMENTS

| | | | |
|---|---|---|---|
| 2,060,007 | 11/1936 | Galbraith | 43/44.85 |
| 2,227,420 | 1/1941 | Augenblick | 43/44.85 |
| 2,545,326 | 3/1951 | Westfall et al. | 43/42.74 |
| 2,564,260 | 8/1951 | Houser | 43/44.85 |
| 2,731,758 | 1/1956 | Coe | 43/43.1 |
| 2,857,704 | 10/1958 | Yamada | 43/44.85 |
| 2,984,882 | 5/1961 | Winn | 43/44.83 |
| 3,120,715 | 2/1964 | Long | 43/43.1 |
| 3,307,288 | 3/1967 | Spina | 43/42.74 |
| 3,426,468 | 2/1969 | Hinkson | 43/42.74 |
| 3,943,652 | 3/1976 | Aunspaugh | 43/42.74 |
| 4,023,302 | 5/1977 | Hoaglin | 43/42.74 |
| 4,117,574 | 10/1978 | Yoshida . | |
| 4,790,104 | 12/1988 | Dorsey . | |
| 4,829,696 | 5/1989 | Sorensen . | |
| 4,862,633 | 9/1989 | Hague et al. | 43/44.84 |
| 4,989,360 | 2/1991 | Lewis | 43/44.85 |
| 5,210,912 | 5/1993 | Hoefkes | 24/131 R |
| 5,402,555 | 4/1995 | Boland | 24/129 C |
| 5,611,169 | 3/1997 | Mayer | 43/44.85 |

FOREIGN PATENT DOCUMENTS

| | | |
|---|---|---|
| 0308379 | 3/1989 | European Pat. Off. . |
| 2375821 | 9/1978 | France . |
| 2544412 | 10/1984 | France . |

OTHER PUBLICATIONS

PCT/AU96/00570 Search Report, 30 Oct. 1996.

*Primary Examiner*—Charles T. Jordan
*Assistant Examiner*—Theresa M. Wesson
*Attorney, Agent, or Firm*—Watts, Hoffman, Fisher & Heinke Co., L.P.A.

[57]           ABSTRACT

A fish trace (10) has a trace line (11) with projections (12) spaced along it, and the projections (12) are selectively engaged by two spaced legs (21) of a resilient clip (13), the leg ends being returned over the legs and the return portions (27) thereby defining a mouth through which the trace line (11) can be simply passed, and a projection (12) can be retained between the legs (21) in a clip (13) by the legs (21) and their return portions (27) and consequent entrapment of the trace line (11) adjacent opposite ends of the projection (12), the legs (21) having to be again deflected for the trace line and projection to come away from the clip. The entire trace can be free of knots which otherwise reduce the line strength.

17 Claims, 4 Drawing Sheets

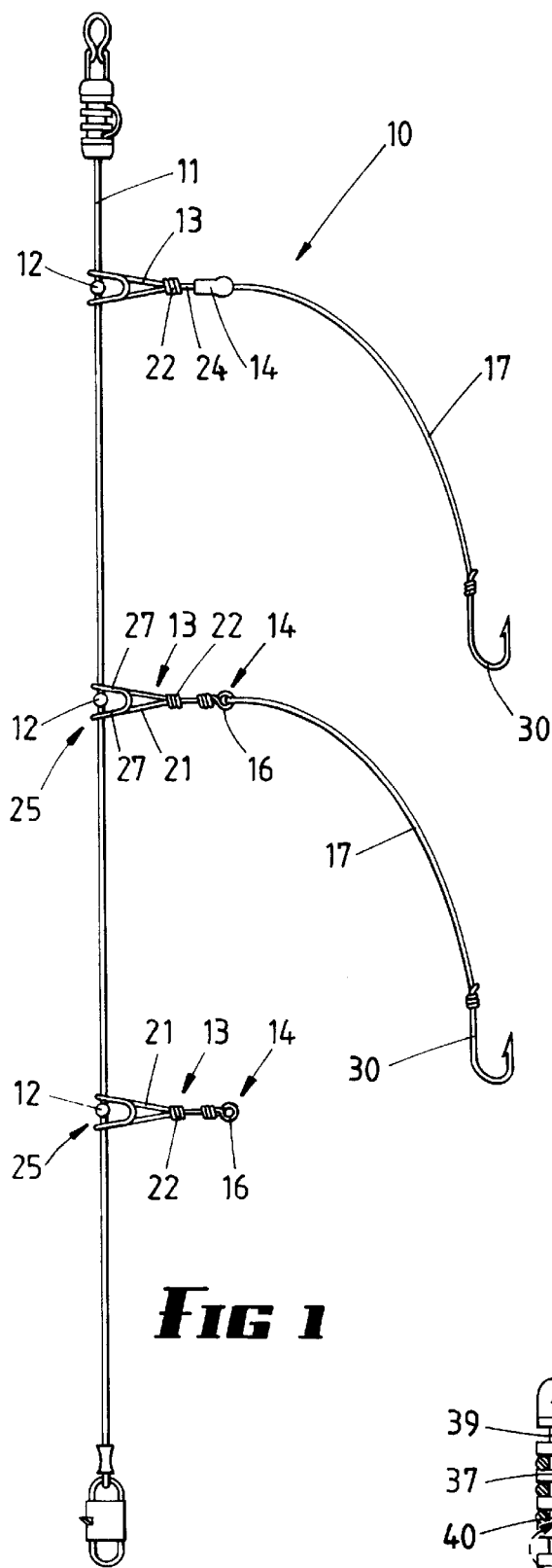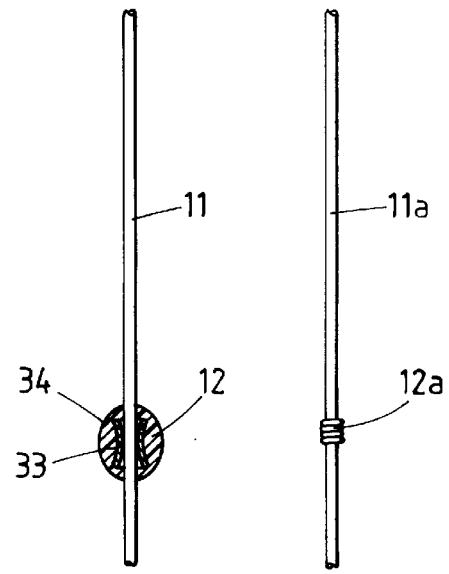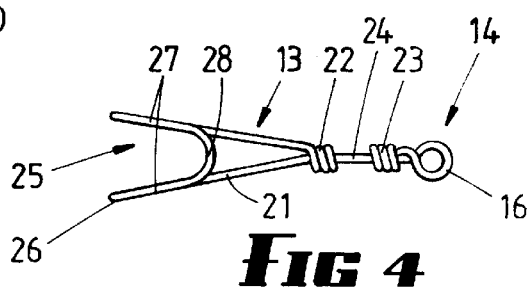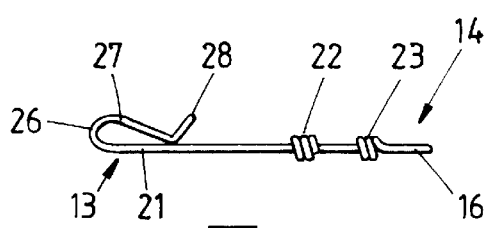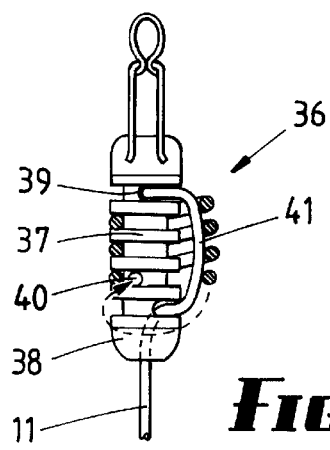

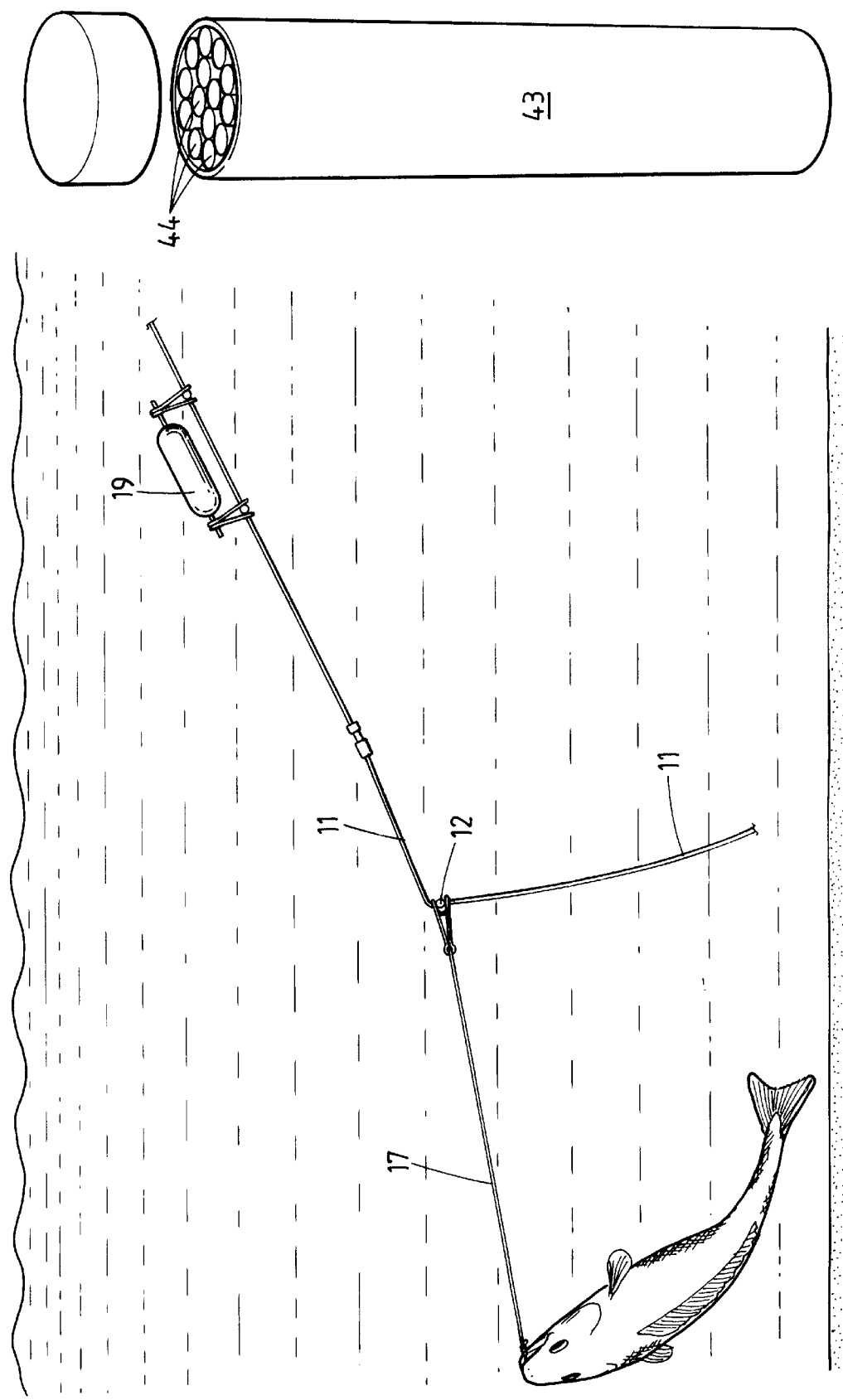

FISH HOOK TRACE AND CONTAINER

This invention relates to a fish hook trace, comprising an assembly of a trace line (line end) and a plurality of hooks on snood (snell) lines.

BACKGROUND OF THE INVENTION

It is known that the term trace is given various meanings by different sportsmen, but in this specification the trace is intended to refer to an assembly of a trace line (line end) which can be attached to or detached from a length of line carried on a fishing reel spool on one of its ends, and can be attached to or detached from a sinker for example at the other end if that is required. The assembly includes a plurality of hooks, and each hook is attached to the line end by a short snood line. The invention is more particularly directed to the attachment of the snood lines of the hooks to the trace line, but also extends to attachment of other equipment (sinkers, floats, berley baskets, etc) to the trace line.

The storage of fully assembled traces including a line end and a plurality of hooks has always constituted a difficulty, and quite frequently the hooks are simply embedded in respective corks, and allowed to fall into lateral locations alongside line end. Unfortunately this occupies a great deal of space and is very inconvenient for transporting purposes.

Another associated problem is that quite often when fish are actively biting, difficulty is encountered with a trace and valuable fishing time is lost while repairs or replacements are undertaken by the fisherman.

Both these difficulties are addressed in this specification wherein the snood line of each of a plurality of hooks, or each of other items of equipment, is quickly and easily clipped onto a trace line end, so that what can take minutes to repair or replace with prior art configurations can be reduced to mere seconds.

A difficulty which is sometimes encountered also is the tendency for the snood lines of hooks to lie alongside a line end (which may not necessarily be vertical when in the water) and another object of the invention is to reduce the likelihood of such an occurrence which renders the relevant hooks ineffectual and sometimes even results in tangles.

BRIEF SUMMARY OF THE INVENTION

In this invention, a fish trace has a trace line with projections spaced along it, and the projections are selectively engaged by two spaced legs of a resilient clip, the leg ends being returned over the legs and the return portions thereby defining a mouth through which the trace line can be simply passed, and the projection can be retained between said legs in a clip by the legs and their return portions and consequent entrapment of the trace line adjacent opposite ends of the projection, the legs having to be again deflected for the trace line and projection to come away from the clip. The entire trace can be free of knots which otherwise reduce the line strength, sometimes by as much as 50%, and in one aspect of the invention there is also provided an end attachment fastened to an end of the trace line without using a knot.

With the invention, a new hook and snood (snell) line having a resilient clip on it which is in accordance with the invention can be replaced in a very short period of time, and having been replaced can provide an angler with a very reliable trace. The trace can be varied for different types of fish, again in a minimum of time. The tension imparted to a fishing line by a fighting fish, and through the snood line and trace of this invention, will be imparted directly by one of the spaced legs engaging the projection in a direction which does not tend to disengage the spring clip from the trace line, because at worst, at least one leg will be substantially aligned with the snood line and also with the trace line, and will bear at its end against the projection carried on the trace line. The invention will also be seen to provide a facility of 360° free rotation of the snood line, both about the trace line, and in some embodiments, about the clip.

BRIEF SUMMARY OF THE PREFERRED EMBODIMENTS

Embodiments of the invention are described hereunder in some detail with reference to and are illustrated in the accompanying drawings in which:

FIG. 1 shows a trace line with attachment means at its two ends, and also illustrates the manner in which snood lines and hooks can be attached;

FIG. 2 is a section through a projection on the trace line, wherein the projections form by a crimped sleeve;

FIG. 3 is a view similar to FIG. 2 but showing the projection formed by a short length of close wound helical spring;

FIG. 4 is side view of a spring clip drawn to a much larger scale than in FIG. 1;

FIG. 5 is an underside view of FIG. 4;

FIG. 6 shows the line end at the top of the trace, in an arrangement which avoids the requirement of a knot;

FIG. 8 illustrates how a fighting fish will apply a force in the direction of engagement of the spring clip with the trace line;

FIG. 9 shows a container for containing the trace lines;

In the embodiment of FIGS. 1 through to 6, a fish trace 10 comprises a trace line 11 having a plurality of projections 12 thereon, the projections 12 as illustrated being generally spherical but, as shown in FIG. 3, they can be other shapes if required, and a resilient clip 13 engages a trace line each side of a projection.

Figure 7:
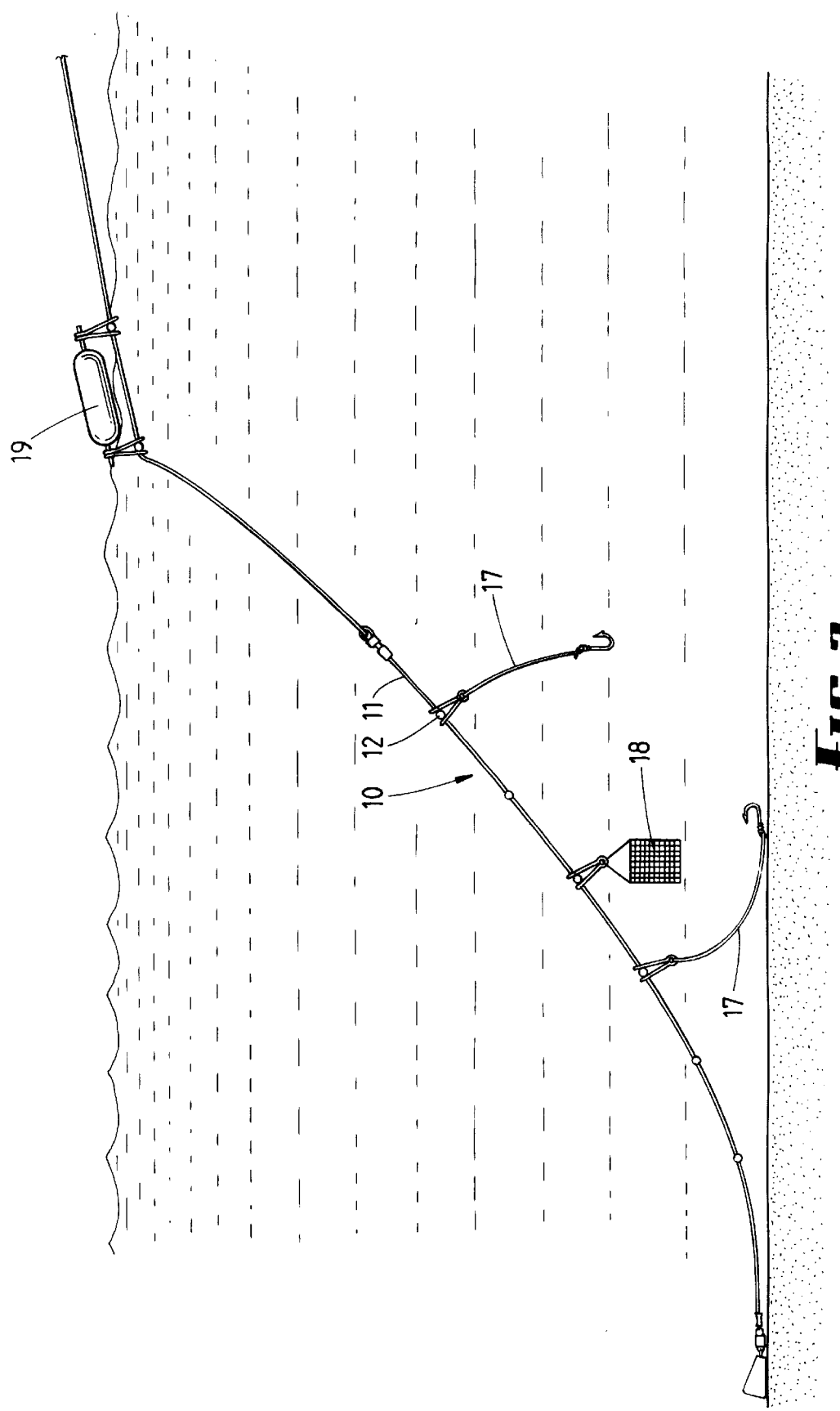
FIG. 7 illustrates how the trace line, hooks and other attachments can be utilised in the water.

One end 14 of the resilient clip is a pendant attachment end, and as shown on the top resilient clip 13 in FIG. 1, the pendant attachment end 14 comprises a swivel, whereas elsewhere in the drawings the pendant attachment end comprises a loop 16, the resilient clip illustrated herein being formed from spring stainless steel wire although a mechanical equivalent in plastics material could be readily produced. As seen in FIGS. 1 and 7, the pendant attachment end 14 can alternatively carry snood lines 17, a berley basket 18, or a float 19.

The other end of the resilient clip 13 comprises a pair of spaced legs 21, and these extend outwardly from a wound terminal portion 22 of the resilient clip, the other terminal portion 23 terminating that portion of the wire length which forms the loop 16 at the pendant attachment end. Both the terminal portions 22 and 23 are wound over a short length 24 of the wire. If, however, the swivel end 14 is used as shown at the top of FIG. 1, only one terminal end 22 is wound over the short length 24.

Referring more specifically to FIG. 4, the legs both terminate at an engagement end 25, and the wire is curved around at 26 to provide two return portions 27 which slope downwardly back over the legs 21 to become contiguous therewith at the ends of the return portions, and those ends are interconnected by a bridge portion 28 which slopes away from the legs 21 to provide a lead in mouth.

The dimensions of the projection 12, the legs 21, leg return portions 27, and bridge portion 28 are such that the projection and that part of the trace line 11 adjacent to the projections are insertable through the mouth defined by the legs 21 and bridge portion 28, by deflection of the spring wire in the legs 21 and return portions 27, so that as best seen in FIG. 1, the legs 21 and return portions 27 straddle the projections 12 and entrap the trace line 11. As illustrated in FIG. 8, when a fish is caught on the hook 30 and applies a tension to the trace line 11, the snood line 17 will become generally aligned with the trace line 11, and when that occurs the two legs 21 will be resisting the tensile forces imparted by the fish, by the curved wire portion 26 abutting the projection 12, and the tension will also tend to keep the curved portion 26 into close contiguity with the projection 12.

FIG. 2 shows a preferred way of forming the projections 12. In FIG. 2 the trace line 11 has a sleeve 33 of copper or aluminium which is crimped between its ends, thereby slightly "bell mouthing" the two ends as illustrated. A small quantity of fluid polymer 34 (for example epoxy resin) applied over the crimp 33 can form a generally spherical or oval shape. It is not always necessary to utilise the resin 34 although this is preferred, but the crimp sleeve 33 can usually perform the function almost as well as the combination with the resin.

In FIG. 3, the trace line 11a is shown with a close wound spring 12a which engages the surface of the trace line 11a with an interference fit. This can also be used either with or without resin surrounding it, and the interference fit can also be associated with a crimping of the spring 12a between its ends.

As stated above, a problem is encountered when knots are used in a trace line. Particularly with sports fishing of a competitive nature, the line size becomes critical and loss of strength is unacceptable. However, even the best knots are frequently the locations of the lowest line strength, and FIG. 6 illustrates a line end attachment 36 which will avoid the use of knots. The outer surface of the line end 36 comprises a plurality of grooves 37, or alternatively a single helical groove 37 between the ends of the attachment 36, and there is provided a first aperture 38 which extends from a central location at the lower end of the attachment 36 to slant upwardly and open into the lower most groove 37. Near the upper end of the attachment 36 is a second aperture 39 which is diametral, and in the bottom or second bottom groove 37 is a third aperture 40. The line end passes upwardly through the first aperture 38, then externally of the attachment line close to the outer surface, and diametrically through the second aperture 39, then being wound around the attachment and urging the external portion 41 into close abutment with the outer surface of the attachment 36, the line finally passing through the third aperture 40 and being retained by passing through the loop of the line itself above aperture 40 and pulled tight. There is then no knot and the variation from linear direction in passing through the first aperture 38 is only slight, thereby providing a strength which is unlikely to be less than 95% of the original line strength.

One of the advantages of this invention is that the lines can be very simply stored, the spring clip 13 causing the snood line 17 to be outstanding away from the trace line 11 (probably as shown in FIG. 7). This is beneficial in use, and also in storage, and FIG. 9 illustrates a storage cylinder 43 which contains a plurality of tubes 44 each containing a fish trace 10 in accordance with this invention.

As shown in FIG. 7, the invention is not limited to use with pendant snood lines 17, but can also be utilised to carry the float 19 or the berley basket 18.

Figure 10:
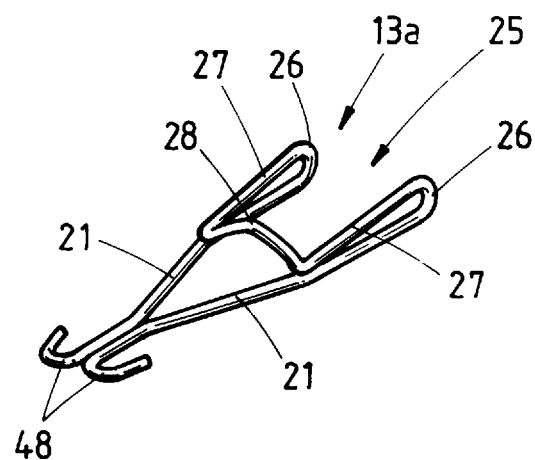
FIG. 10 shows a first alternative design of a clip with two legs.
Figure 11:
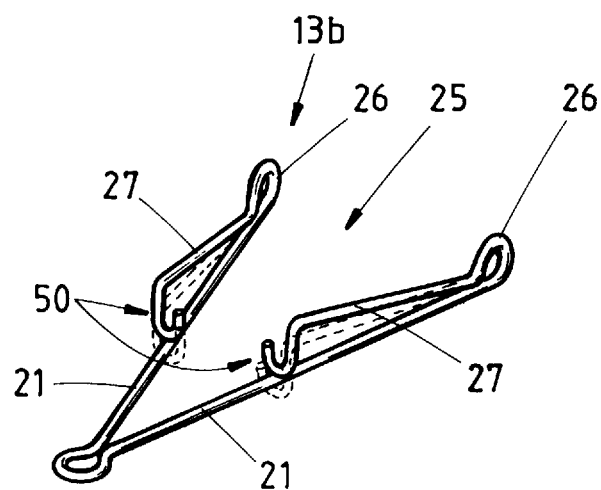
FIG. 11 shows a second alternative design of a clip with two legs.

FIGS. 10 and 11 show alternatives 13A and 13B of the clip 13. Clip 13A (FIG. 10) has the spaced legs 21 curved around at 26 to provide the return portions 27 connected by bridge portion 28, and the return portions 27 slope downwardly (as drawn) over respective legs 21 to become contiguous therewith, the bridge portion 28 sloping upwardly to provide a lead-in mouth. All this is similar to the clip illustrated in FIGS. 4 and 5 and described above. However, instead of ends of the wire being wound as at 22 and 23 in FIGS. 4 and 5, they terminate in out-turned open loops 48 at the pendant end which can retain a snood line in the same way as the loop 16 in FIGS. 4 and 5, but production of the FIG. 10 alternative may be simpler. Loops 48 need not be open, but the wire may be turned a full 360° to form two closed loops one overlying the other, if difficulty is encountered by open hooks catching on lines, for example.

Clip 13B (FIG. 11) also has the spaced legs 21 curved around at 26 to provide the return portions 27, which are not however connected by a bridge. The free ends 50 of the portions 27 terminate in hooks which are upwardly facing (as drawn), but can be closed over respective legs 27, as shown in FIG. 11, by resilient deformation of the wire. The closed position is shown in dashed lines. The two closed loops thus formed also entrap the trace line 11, as in the first two described embodiments, but that entrapment is more secure, since any force applied to return portions 27 will not tend to open the loops, but to retain them closed.

The invention results in a particularly useful rig for a fisherman, which is of low cost and which overcomes some of the major problems encountered in the sport.

I claim:

1. A fish trace, comprising a trace line, at least one projection fast with said trace line, a resilient clip having two ends, one said end being a pendant attachment end, the other said end being an engagement end and having a pair of spaced legs, each of which has a leg return portion, the shapes of the legs and return portions defining between them a lead-in mouth, the dimensions of said projection, legs and return portions being such that said trace line portions adjacent opposite sides of said projection are insertable through said mouth into spaces between said legs and their return portions, and said projection is retained between said legs and their return portions by entrapment of said trace line adjacent said projection.

2. A fish trace according to claim 1 wherein said legs diverge towards said leg return portions from said pendant attachment end.

3. A fish trace according to claim 1 further comprising a bridge portion joining said return portions, and wherein said leg return portions slope back to become contiguous with said legs, and slope away from said legs to said bridge which is spaced a distance from said legs.

4. A fish trace according to claim 1 wherein said pendant attachment end comprises a loop.

5. A fish trace according to claim 4 wherein said pendant attachment end comprises a swivel.

6. A fish trace according to claim 3 wherein said clip is unitary, comprising a single length of wire.

7. A fish trace according to claim 3 wherein each said projection comprises a short crimp sleeve which firmly grips said trace line between its ends.

8. A fish trace according to claim 7 further comprising a polymeric material enveloping said crimp sleeve.

9. A fish trace according to claim 1 wherein each said projection comprises a short helix of wire surrounding said trace line and engaging it with an interference fit.

10. A fish trace according to claim 1 further comprising a snood line having two ends, one said snood line end being fast with said pendant attachment end of said clip, the other said snood line end being fast with a hook.

11. A fish trace according to claim 1 further comprising a line end attachment fast with an end of said trace line, said line end attachment having surfaces defining grooves between its ends, a first aperture extending from a central location at one end into a said groove, and a second aperture extending diametrically through said attachment at its other said end, and a third aperture extending diametrically through said attachment near its said one end.

12. A fish trace according to claim 11 wherein said trace line end passes through said first aperture, externally of said attachment, through said second aperture, around said attachment, over the external portion of said trace line and said attachment, and through said third aperture.

13. A fish trace according to claim 1 wherein said clip has a leg bridge between said return portions, the shapes of the legs, return portions and bridge defining between them said lead-in mouth.

14. A clip for a fish trace according to claim 13 wherein said leg return portions slope back to become contiguous with said legs, and slope away from said legs to said bridge which is spaced a distance from said legs.

15. A fish trace according to claim 1 wherein each said leg is curved around to provide a respective further return portion having a free end in the shape of a hook facing away from the relevant leg, the clip comprising wire of sufficient resilience that each said hook is deflectable to releasably engage a said leg and thereby form a closed loop therewith.

16. A clip for attachment to a fish trace comprising a resilient member having two ends, one said end comprising a pendant attachment, and the other said end being an engagement end and having a pair of spaced legs, each of which has a leg return portion, and a leg bridge between said return portions, the shapes of the legs, return portions and bridge defining between them a lead-in mouth, the dimensions of said projection, legs and bridge being such that a projection on a trace line and such trace line are insertable through said mouth to insert such projection and line into a space between said legs, return portions and bridge by deflection of said legs and their return portions, and retain such projection and line in said space by resilient recovery of said legs and return portions.

17. A clip for a fish trace according to claim 16 wherein said leg return portions slope back to become contiguous with said legs, and slope away from said legs to said bridge which is spaced a distance from said legs.

* * * * *